US010230800B2

(12) United States Patent
Wu (10) Patent No.: US 10,230,800 B2
(45) Date of Patent: Mar. 12, 2019

(54) METHOD FOR ESTABLISHING MANAGEMENT SESSION, CUSTOMER PREMISES EQUIPMENT, AND AUTO-CONFIGURATION SERVER (71) Applicant: Huawei Device Co., Ltd., Dongguan (CN)

(72) Inventor: Huangwei Wu, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 447 days.

(21) Appl. No.: 14/139,547

(22) Filed: Dec. 23, 2013

(65) Prior Publication Data
US 2014/0115177 A1    Apr. 24, 2014

Related U.S. Application Data (63) Continuation of application No. PCT/CN2012/080597, filed on Aug. 27, 2012.

(30) Foreign Application Priority Data

Aug. 26, 2011 (CN) .......................... 2011 1 0249208

(51) Int. Cl.
H04L 29/08 (2006.01)
H04L 12/26 (2006.01)
(Continued)

(52) U.S. Cl.
CPC .......... H04L 67/141 (2013.01); H04L 41/044 (2013.01); H04L 41/12 (2013.01);
(Continued)

(58) Field of Classification Search
CPC ....... H04L 7/00; H04L 7/0004; H04L 7/0079; H04L 7/0091; H04L 12/00; H04L 12/02;
(Continued)

(56) References Cited

U.S. PATENT DOCUMENTS

2006/0178131 A1* 8/2006 Huotari ................. H04L 63/062
455/410
2006/0242664 A1* 10/2006 Kikkawa ............ H04N 21/4627
725/37
(Continued)

FOREIGN PATENT DOCUMENTS

CN 101350734 A 1/2009
CN 101442705 A 5/2009
(Continued)

OTHER PUBLICATIONS

Bernstein et al. TR-111, DSL Forum, Dec. 2005.*
(Continued)

Primary Examiner — Tauqir Hussain
Assistant Examiner — Boris D Grijalva Lobos
(74) Attorney, Agent, or Firm — Slater Matsil, LLP (57) ABSTRACT Embodiments of the present invention disclose a method for establishing a management session, a customer premises equipment, and an auto-configuration server. The method includes generating a universal resource locator URL list according to a corresponding IP address of each uplink interface. The URL list includes at least two URLs and each URL has a corresponding uplink interface. The URL list is sent to an auto-configuration server ACS. A connection request sent by the auto-configuration server is received through a first uplink interface. The connection request includes a first URL, the first URL is a URL in the URL list, and the first URL corresponds to the first uplink interface. A second uplink interface is determined. The second uplink interface is an uplink interface used for initiating a management session. A management session to the auto-configuration server is initiated using the second uplink interface.

19 Claims, 5 Drawing Sheets (51) Int. Cl.
  *H04L 12/24* (2006.01)
  *H04L 29/12* (2006.01)
  *H04L 29/06* (2006.01)

(52) U.S. Cl.
  CPC .............. *H04L 43/08* (2013.01); *H04L 43/10* (2013.01); *H04L 61/1511* (2013.01); *H04L 61/2076* (2013.01); H04L 41/0213 (2013.01); H04L 43/0811 (2013.01); H04L 43/0829 (2013.01); H04L 43/0852 (2013.01); H04L 63/08 (2013.01)

(58) Field of Classification Search
  CPC ..................... H04L 12/12; H04L 12/24; H04L 12/2424–12/2426; H04L 12/2428; H04L 12/2441; H04L 12/2442; H04L 12/2447; H04L 12/2449; H04L 12/2453; H04L 12/2484; H04L 12/26; H04L 12/66; H04L 41/00; H04L 41/04; H04L 41/044; H04L 41/08–41/0806; H04L 41/0813; H04L 41/085–41/0876; H04L 41/0886; H04L 41/12; H04L 45/00; H04L 45/02; H04L 45/24; H04L 45/52; H04L 67/00; H04L 67/14–67/146; H04L 67/16
  See application file for complete search history.

(56) References Cited

U.S. PATENT DOCUMENTS

| | | | |
|---|---|---|---|
| 2007/0283025 A1 | 12/2007 | Yi et al. | |
| 2008/0137673 A1* | 6/2008 | Phuah | H04L 12/66 370/401 |
| 2008/0215668 A1* | 9/2008 | Hu | H04L 41/0806 709/202 |
| 2008/0232336 A1* | 9/2008 | Elkady | H04W 92/02 370/338 |
| 2009/0028170 A1* | 1/2009 | Jiang | H04L 12/2856 370/406 |
| 2009/0150526 A1* | 6/2009 | Wu | H04L 12/2898 709/220 |
| 2009/0282448 A1 | 11/2009 | Liu et al. | |
| 2010/0030875 A1 | 2/2010 | Visser et al. | |
| 2010/0061364 A1* | 3/2010 | Damola | H04L 12/5692 370/352 |
| 2011/0138063 A1* | 6/2011 | Wu | H04L 29/12066 709/227 |
| 2011/0141905 A1* | 6/2011 | Jiang | H04W 48/08 370/241 |
| 2011/0173348 A1* | 7/2011 | Van De Poel | H04L 12/4625 709/249 |
| 2011/0202956 A1* | 8/2011 | Connelly | H04N 21/433 725/38 |
| 2011/0228750 A1* | 9/2011 | Tomici | H04L 63/30 370/338 |
| 2011/0306332 A1* | 12/2011 | Macpherson | H04L 41/0806 455/419 |
| 2012/0185506 A1* | 7/2012 | Gomez Maturana | H04L 67/10 707/769 |

FOREIGN PATENT DOCUMENTS

| | | |
|---|---|---|
| CN | 101552802 A | 10/2009 |
| CN | 101783739 A | 7/2010 |
| EP | 2015537 A1 | 1/2009 |
| EP | 2096793 A1 | 9/2009 |
| EP | 2299630 A1 | 3/2011 |

OTHER PUBLICATIONS

WO2013029507 ISA Written Report.*
TR-069—A Crash Course—University of New Hampshire—2009.*
TR-069 CPE WAN Management Protocol, Issue 1 Amendment 4, Issue Date Jul. 2011, Protocol Version 1.3, 190 pages.
TR-069 CPE WAN Management Protocol v1.1, Version Issue 1 Amendment 2, Version Date Dec. 2007, 138 pages.
Noriega-Vivas, P., et al., "Supporting L3 Femtocell Mobility Using the MOBIKE Protocol," Access 2011: The Second International Conference on Access Networks, Jun. 19-24, 2011, pp. 30-35.

* cited by examiner

METHOD FOR ESTABLISHING MANAGEMENT SESSION, CUSTOMER PREMISES EQUIPMENT, AND AUTO-CONFIGURATION SERVER

This application is a continuation of International Application No. PCT/CN2012/080597, filed on Aug. 27, 2012, which claims priority to Chinese Patent Application No. 201110249208.3, filed with the Chinese Patent Office on Aug. 26, 2011, both of which are thereby incorporated by reference in their entireties.

TECHNICAL FIELD

The present invention relates to the field of communications technologies, and in particular, to a method for establishing a management session, a customer premises equipment, and an auto-configuration server.

BACKGROUND

In an existing broadband network system, the BBF (Broadband Forum, Broadband Forum) defines the TR-069 protocol for a management server to remotely manage a CPE (customer premises equipment). In the TR-069 protocol, a CPE may establish a CWMP (CPE WAN Management Protocol, CPE wide area network management protocol) management session with an ACS (auto-configuration server) at any time by actively sending a notification message. The auto-configuration server implements management on a customer premises equipment by using the session. However, the auto-configuration server cannot directly establish a management session with the customer premises equipment. To enable the auto-configuration server to actively require establishing a session with the customer premises equipment, the customer premises equipment provides a connection request URL (universal resource locator), and reports the URL to the auto-configuration server in each notification message. If the auto-configuration server needs the customer premises equipment to initiate a management session, the only way is to send an HTTP GET request to the connection request URL provided by the CPE. The HTTP GET request may carry authentication information that is configured in advance. After completing authentication on the auto-configuration server, the customer premises equipment responds to the auto-configuration server with an HTTP 200OK message. Then, the customer premises equipment establishes a management session with the auto-configuration server through the notification message, and the auto-configuration server implements management on the customer premises equipment by using the session.

In the process of implementing the present invention, the inventor finds that the prior art has at least the following problem: With the development of technologies and the deployment demand of small business gateways, a plurality of uplink interfaces are deployed in a small business gateway. For example, uplink interfaces such as asymmetric digital subscriber line (ADSL), fiber access, and wireless fidelity (WiFi) are deployed together. However, in the prior art, only the situation that a customer premises equipment only has one uplink interface is considered, where each customer premises equipment can have only one connection request URL and can report only one connection request URL to an auto-configuration server, so that establishment of a management session between a customer premises equipment supporting a plurality of uplink manners and the auto-configuration server cannot be implemented.

SUMMARY OF THE INVENTION

Embodiments of the present invention provides a method for establishing a management session, a customer premises equipment, and an auto-configuration server, which are capable of implementing establishment of a management session between a customer premises equipment supporting a plurality of uplink manners and an auto-configuration server.

The technical solution adopted in the various embodiments of the present invention is as follows.

In one embodiment of the present invention, a method for establishing a management session includes generating a universal resource locator URL list according to IP addresses of uplink interfaces. The URL list includes at least two URLs and each URL has a corresponding uplink interface. The URL list is sent to an auto-configuration server. A connection request sent by the auto-configuration server is received through a first uplink interface. The connection request includes a first URL. The first URL is a URL in the URL list, and the first URL corresponds to the first uplink interface. A second uplink interface is determined. The second uplink interface is an uplink interface used for initiating a management session. The second uplink interface is used to initiate a management session to the auto-configuration server.

In one embodiment of the present invention, a method for establishing a management session includes receiving a universal resource locator URL list sent by a customer premises equipment. A first URL is selected from the URL list to send a connection request to the customer premises equipment. The connection request includes the first URL, and the first URL corresponds to a first uplink interface of the customer premises equipment. A management session is established that is initiated by the customer premises equipment by using the second uplink interface.

In one embodiment of the present invention, a customer premises equipment includes a generating module, generating a universal resource locator URL list according to IP addresses of uplink interfaces. The URL list includes at least two URLs and each URL has a corresponding uplink interface. A URL list reporting module is configured to send the URL list to an auto-configuration server. A connection request receiving module is configured to receive, through a first uplink interface, a connection request sent by the auto-configuration server. The connection request includes a first URL, the first URL is a URL in the URL list, and the first URL corresponds to the first uplink interface. A session initiating module is configured to use a second uplink interface to initiate a management session to the auto-configuration server.

In one embodiment of the present invention, an auto-configuration server includes a universal resource locator URL list receiving module, configured to receive a universal resource locator URL list sent by a customer premises equipment. A connection request initiating module is configured to select a first URL from the URL list to send a connection request to the customer premises equipment. The connection request includes the first URL, and the first URL corresponds to a first uplink interface of the customer premises equipment. A session establishing module is configured to establish a management session that is initiated by the customer premises equipment by using a second uplink interface.

The embodiments of the present invention provides a method for establishing a management session, a customer premises equipment, and an auto-configuration server, where a customer premises equipment CPE generates a universal resource locator URL list according to a corresponding IP address of each uplink interface and then reports the URL list to an auto-configuration server ACS; the ACS selects a first URL from the URL list to initiate a connection request to the CPE; and the CPE, after completing authentication on the connection request from the ACS, determines according to the URL in the connection request, a second uplink interface used for initiating a management session, uses the second uplink interface to initiate a management session to the ACS, and establishes a management session with the ACS. Compared with the prior art, the method for establishing a management session, the customer premises equipment, and the auto-configuration server provided by the embodiments of the present invention are capable of implementing establishment of a management session between a customer premises equipment supporting a plurality of uplink manners and an auto-configuration server.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and embodiments.

Embodiment 1

Figure 1:
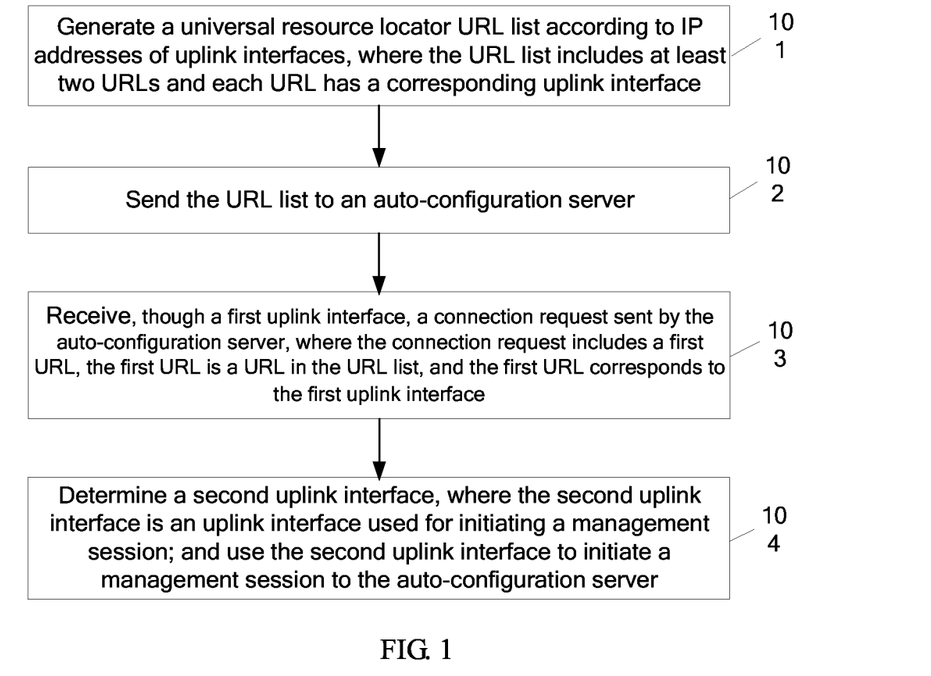
FIG. 1 is a flowchart of a method according to embodiment 1 of the present invention.

This embodiment provides a method for establishing a management session. As shown in FIG. 1, the method includes the following steps described below.

Step 101: A customer premises equipment CPE generates a universal resource locator URL list according to IP addresses of uplink interfaces. The URL list includes at least two URLs and each URL has a corresponding uplink interface.

Specifically, the URL may be composed of a protocol type (such as http), a host name (such as its IP address), a port number, and a path.

Step 102: The customer premises equipment sends the URL list to an auto-configuration server.

Specifically, the sending the URL list to an auto-configuration server may further includes sending, to the auto-configuration server, information of the uplink interface corresponding to each URL in the URL list.

Optionally, the sending the URL list to an auto-configuration server specifically includes sending one or more URLs in the URL list to the auto-configuration server.

Step 103: The customer premises equipment receives, though a first uplink interface, a connection request sent by the auto-configuration server. The connection request includes a first URL, the first URL is a URL in the URL list, and the first URL corresponds to the first uplink interface.

Step 104: The customer premises equipment determines a second uplink interface. The second uplink interface is an uplink interface used for initiating a management session. The second uplink interface uses the second uplink interface to initiate a management session to the auto-configuration server.

Specifically, the receiving a connection request sent by the auto-configuration server and determining a second uplink interface used for initiating a management session may include determining the second uplink interface used for initiating a management session, according to specification in the connection request and/or status of each uplink interface, after completing authentication on the auto-configuration server. For example, when an uplink interface used for initiating a management session is specified in the connection request, the specified uplink interface is used as the second uplink interface. Alternatively, according to the status of each uplink interface, for example, information such as whether it is connectable, a delay, and a packet loss rate, an uplink interface is selected as the second uplink interface: for example, an uplink interface that is connectable and has the shortest delay and lowest packet loss rate is selected as the second uplink interface. In a situation that an uplink interface used for initiating a management session is specified in the connection request, the second uplink interface may be determined with reference to the status of each uplink interface: for example, an uplink interface that is connectable and has the shortest delay and lowest packet loss rate is selected as the second uplink interface, but if there are at least two connectable uplink interfaces that have the shortest delay and lowest packet loss rate, and one of them is the specified uplink interface, the specified uplink interface is selected as the second uplink interface.

It should be noted that, the first uplink interface and the second uplink interface are not necessarily the same uplink interface.

Optionally, the method further includes updating the URL list when status of the uplink interface changes, and sending the updated URL list to the auto-configuration server.

The embodiment of the present invention provides a method for establishing a management session, where a customer premises equipment CPE generates a universal resource locator URL list according to a corresponding IP address of each uplink interface and then reports the URL list to an auto-configuration server ACS; the ACS selects a first URL from the URL list to initiate a connection request to the CPE; and the CPE, after completing authentication on the connection request from the ACS, determines a second uplink interface used for initiating a management session, uses the second uplink interface to initiate a management session to the ACS, and establishes the management session with the ACS. Compared with the prior art, the method for establishing a management session, the customer premises equipment, and the auto-configuration server provided by the embodiments of the present invention are capable of implementing the establishment of a management session between a customer premises equipment supporting a plurality of uplink manners and an auto-configuration server.

Embodiment 2

Figure 2:
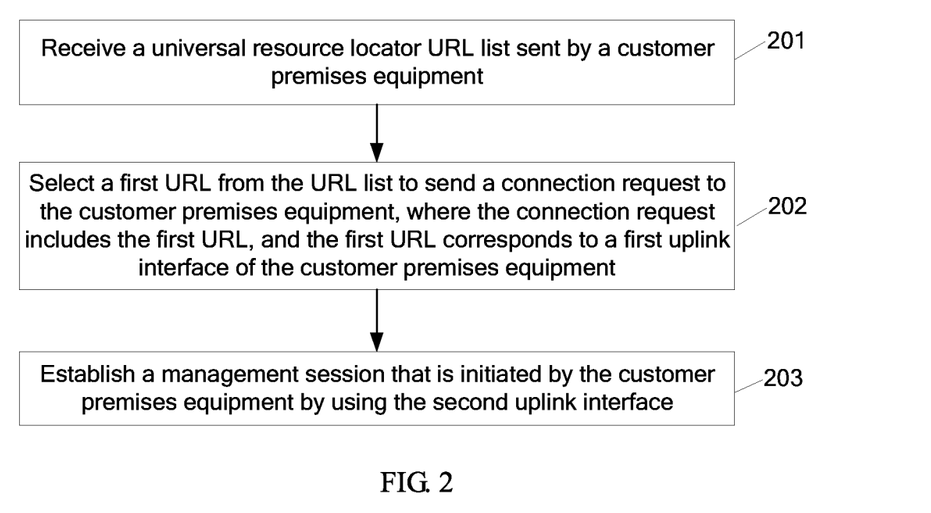
FIG. 2 is a flowchart of a method according to embodiment 2 of the present invention.

This embodiment provides a method for establishing a management session. As shown in FIG. 2, the method includes the following steps described below.

Step 201: An auto-configuration server receives a universal resource locator URL list sent by a customer premises equipment.

Step 202: The auto-configuration server selects a first URL from the URL list to send a connection request to the customer premises equipment. The connection request includes the first URL, and the first URL corresponds to a first uplink interface of the customer premises equipment.

Specifically, the selecting a first URL from the URL list to send a connection request to the customer premises equipment may include selecting the first URL from the URL list to send the connection request to the customer premises equipment according to information of a corresponding uplink interface of each URL in the URL list, and/or a testing situation of each uplink interface.

For example, the auto-configuration server may obtain the IP address included in each URL in the URL list, then use a Ping protocol to test connectivity between each IP address and the auto-configuration server, and determine a corresponding link situation: information such as whether it is connectable, a delay, and a packet loss rate. Base on the information, the auto-configuration server may select a URL to send a connection request to the customer premises equipment.

A second uplink interface used for the customer premises equipment to initiate a management session may be specified in the connection request.

Step 203: Establish a management session that is initiated by the customer premises equipment by using the second uplink interface.

It should be noted that, the first uplink interface and the second uplink interface are not necessarily the same uplink interface.

In the method for establishing a management session provided by the embodiment of the present invention, an auto-configuration server ACS receives a URL list reported by a customer premises equipment CPE, and selects a first URL from the URL list to initiate a connection request to the CPE, where the connection request includes the first URL; the ACS establishes a management session that is initiated by the CPE by using a second uplink interface and establishes the management session with the CPE. Compared with the prior art, the method for establishing a management session provided by the embodiment of the present invention is capable of implementing the establishment of a management session between a CPE supporting a plurality of uplink manners and an ACS.

Embodiment 3

Figure 3:
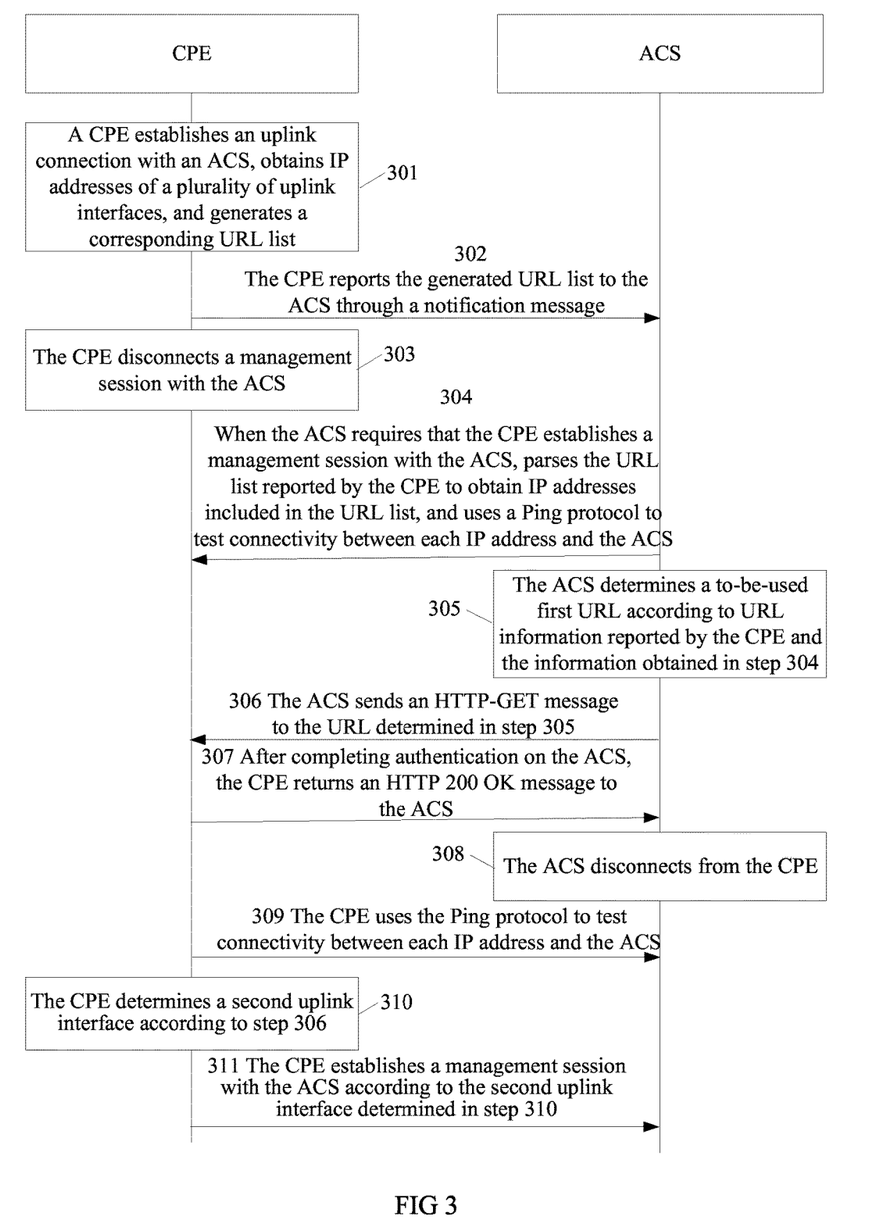
FIG. 3 is a flowchart of a method according to embodiment 3 of the present invention.

This embodiment provides a method for establishing a management session. As shown in FIG. 3, the method includes the following steps described below.

Step: 301: A CPE establishes an uplink connection with an ACS, obtains IP addresses of a plurality of uplink interfaces, and generates a corresponding URL list.

Optionally, when a situation of an uplink interface changes, the CPE updates the URL list.

Step 302: The CPE reports the generated URL list to the ACS through a notification message.

Specifically, the reporting the generated URL list to the ACS through a notification message by the CPE may include reporting, to the ACS, information of an uplink interface corresponding to each URL in the URL list, reporting, to the ACS, a preferable URL that is selected from the URL list, and reporting, to the ACS, a URL list that is updated after an uplink interface changes.

Step 303: The CPE disconnects a management session with the ACS.

Step 304: When the ACS requires that the CPE establishes a management session with the ACS, the ACS parses the URL list reported by the CPE, to obtain IP addresses included in the URL list, and uses a Ping (Packet Internet Grope, packet internet grope) protocol to test connectivity between each IP address and the ACS.

Specifically, the testing content may include: whether it is connectable, a delay, a packet loss rate, and so on.

Step 305: The ACS determines a to-be-used first URL according to URL information reported by the CPE and the information obtained in step 304.

Specifically, a URL that has good connectivity with the ACS and has a short delay and a low packet loss rate may be selected as the first URL.

Step 306: The ACS sends an HTTP-GET message to the URL determined in step 305.

Further, the ACS may specify, in a header field of the HTTP-GET message, a second uplink interface used for the CPE to initiate a management session.

Step 307: After completing authentication on the ACS, the CPE returns an HTTP 200 OK message to the ACS.

Step 308: The ACS disconnects from the CPE.

Generally, according to the TR-069 protocol, this step needs to be performed.

Step 309: The CPE uses the Ping protocol to test connectivity between each IP address and the ACS.

Specifically, the testing content may include: whether it is connectable, a delay, a packet loss rate, and so on.

Step 310: The CPE determines the second uplink interface according to step 306.

Specifically, an uplink interface that has good connectivity with the ACS and has a short delay and a low packet loss rate may be selected as the second uplink interface. For example, when an uplink interface used for initiating a management session is specified in the connection request, the specified uplink interface is used as the second uplink interface. Alternatively, according to status of each uplink interface, for example, information such as whether it is connectable, a delay, and a packet loss rate, an uplink interface is selected as the second uplink interface: for example, an uplink interface that is connectable and has the shortest delay and lowest packet loss rate is selected as the second uplink interface. In a situation that an uplink interface used for initiating a management session is specified in the connection request, the second uplink interface may be determined with reference to the status of each uplink interface: for example, an uplink interface that is connectable and has the shortest delay and lowest packet loss rate is selected as the second uplink interface, but if there are at least two connectable uplink interfaces that have the shortest delay and lowest packet loss rate, and one of them is the specified uplink interface, the specified uplink interface is selected as the second uplink interface.

It should be noted that, the first uplink interface and the second uplink interface are not necessarily the same uplink interface.

Step 311: The CPE establishes a management session with the ACS according to the second uplink interface determined in step 310.

In the method for establishing a management session provided by the embodiment of the present invention, a customer premises equipment CPE generates a universal resource locator URL list according to the corresponding IP address of each uplink interface, where each URL in the URL list corresponds to an IP address, and then reports the URL list to an auto-configuration server ACS; the ACS selects a first URL from the URL list to initiate a connection request; and the CPE receives the connection request initiated by the ACS, where the connection request includes the URL selected by the ACS from the URL list, after completing authentication on the ACS, according to the URL selected by the ACS from the URL list in the connection request, determines a second uplink interface used for initiating a management session, uses the second uplink interface to initiate a management session to the ACS, and establishes the management session with the ACS. Compared with the prior art, the method for establishing a management session provided by the embodiment of the present invention is capable of implementing the establishment of a management session between a customer premises equipment supporting a plurality of uplink manners and an auto-configuration server.

Embodiment 4

Figure 4:
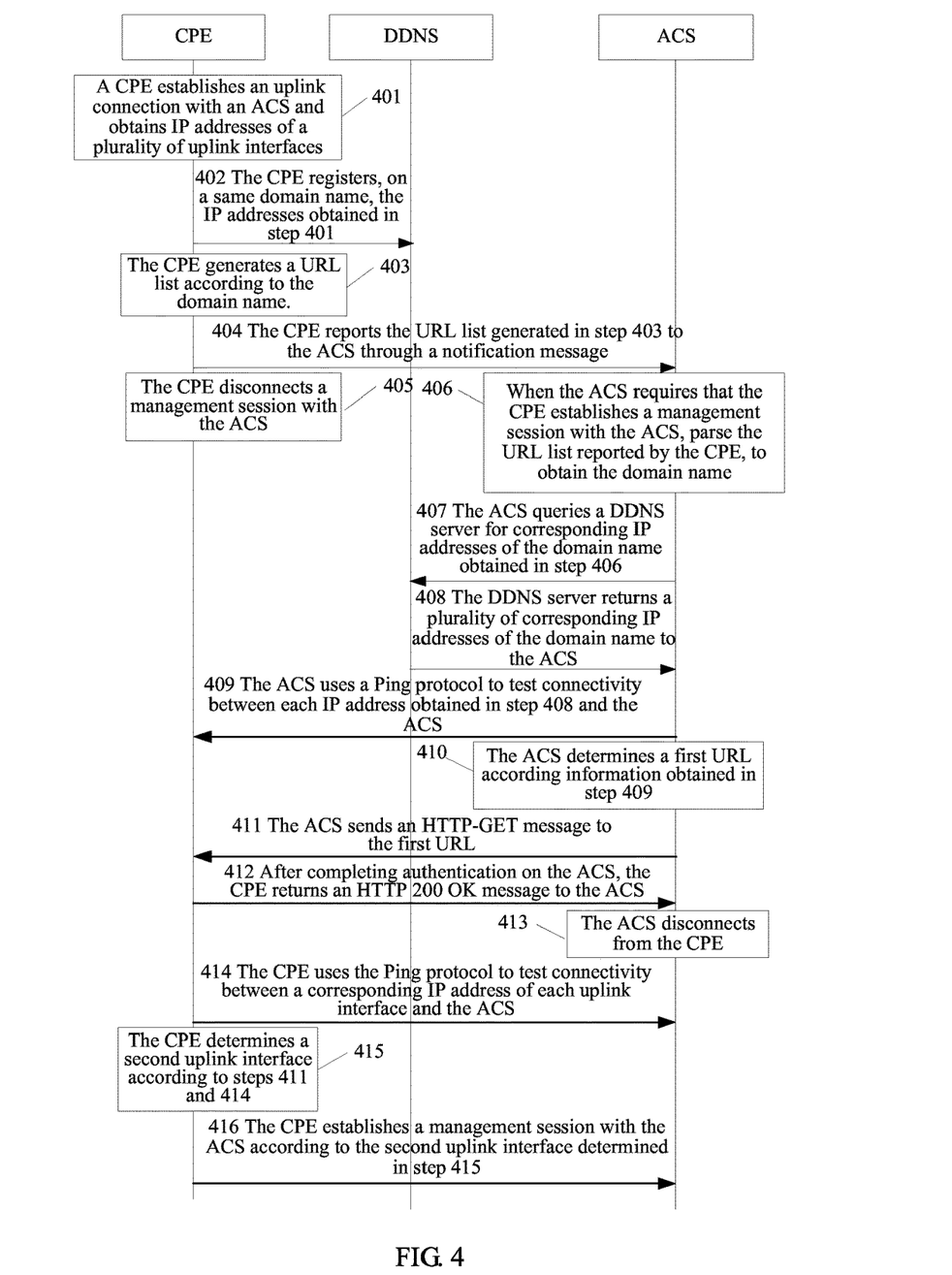
FIG. 4 is a flowchart of a method according to embodiment 4 of the present invention.

This embodiment provides a method for establishing a management session. As shown in FIG. 4, the method includes the following steps described below.

Step 401: A CPE establishes an uplink connection with an ACS and obtains IP addresses of a plurality of uplink interfaces.

Optionally, when a situation of an uplink interface of the CPE changes, the CPE may update the IP addresses.

Step 402: The CPE registers, on a same domain name, the IP addresses obtained in step 401.

Step 403: The CPE generates a URL list according to the domain name.

Step 404: The CPE reports the URL list generated in step 403 to the ACS through a notification message.

Specifically, the reporting the URL list generated in step 403 to the ACS may include reporting, to the ACS, information of an uplink interface corresponding to each URL in the URL list, and reporting, to the ACS, a preferable URL that is selected from the URL list.

Step 405: The CPE disconnects a management session with the ACS.

Step 406: When the ACS requires that the CPE establishes a management session with the ACS, the ACS parses the URL list reported by the CPE, to obtain the domain name.

The URLs in the URL list may share one domain name and have different port values.

Step 407: The ACS queries a DDNS server for corresponding IP addresses of the domain name obtained in step 406.

Step 408: The DDNS server returns a plurality of corresponding IP addresses of the domain name to the ACS.

Step 409: The ACS uses the Ping protocol to test connectivity between each IP address obtained in step 408 and the ACS.

Specifically, the testing content may include: whether it is connectable, a delay, a packet loss rate, and so on.

Step 410: The ACS determines a first URL according information obtained in step 409.

Specifically, a URL that has good connectivity with the ACS and has a short delay and a low packet loss rate may be selected as the first URL.

Step 411: The ACS sends an HTTP-GET message to the first URL.

Step 412: After completing authentication on the ACS, the CPE returns an HTTP 200 OK message to the ACS.

Further, the ACS may specify, in a header field of the HTTP-GET message, an uplink interface used for the CPE to initiate a management session.

Step 413: The ACS disconnects from the CPE.

Generally, according to the TR-069 protocol, this step needs to be performed.

Step 414: The CPE uses the Ping protocol to test connectivity between a corresponding IP address of each uplink interface and the ACS.

Specifically, the testing content may include: whether it is connectable, a delay, a packet loss rate, and so on.

Step 415: The CPE determines a second uplink interface according to steps 411 and 414.

Specifically, an uplink interface that has good connectivity with the ACS and has a short delay and a low packet loss rate may be selected. For example, when an uplink interface used for initiating a management session is specified in the connection request, the specified uplink interface is used as the second uplink interface. Alternatively, according to status of each uplink interface, for example, information such as whether it is connectable, a delay, and a packet loss rate, an uplink interface is selected as the second uplink interface: for example, an uplink interface that is connectable and has the shortest delay and lowest packet loss rate is selected as the second uplink interface. In a situation that an uplink interface used for initiating a management session is specified in the connection request, the second uplink interface may be determined with reference to the status of each uplink interface: for example, an uplink interface that is connectable and has the shortest delay and lowest packet loss rate is selected as the second uplink interface, but if there are at least two connectable uplink interfaces that have the shortest delay and lowest packet loss rate, and one of them is the specified uplink interface, the specified uplink interface is selected as the second uplink interface.

It should be noted that, the first uplink interface and the second uplink interface are not necessarily the same uplink interface.

Step 416: The CPE establishes a management session with the ACS according to the second uplink interface determined in step 415.

In the method for establishing a management session provided by the embodiment of the present invention, a customer premises equipment CPE registers the corresponding IP address of each uplink interface on the same domain name, generates a universal resource locator URL list, where each URL in the URL list corresponds to one IP address, and then reports the URL list to an auto-configuration server ACS; the ACS selects a first URL from the URL list to initiate a connection request; and the CPE receives the connection request initiated by the ACS, where the connection request includes an IP address that may be used by the CPE to initiate a management session, after completing authentication on the ACS, determines an uplink interface used for initiating the management session, uses the uplink interface to initiate the management session to the ACS, and establishes the management session with the ACS. Compared with the prior art, the method for establishing a management session provided by the embodiment of the present invention is capable of implementing the establishment of a management session between a customer premises equipment supporting a plurality of uplink manners and an auto-configuration server.

Embodiment 5

Figure 5:
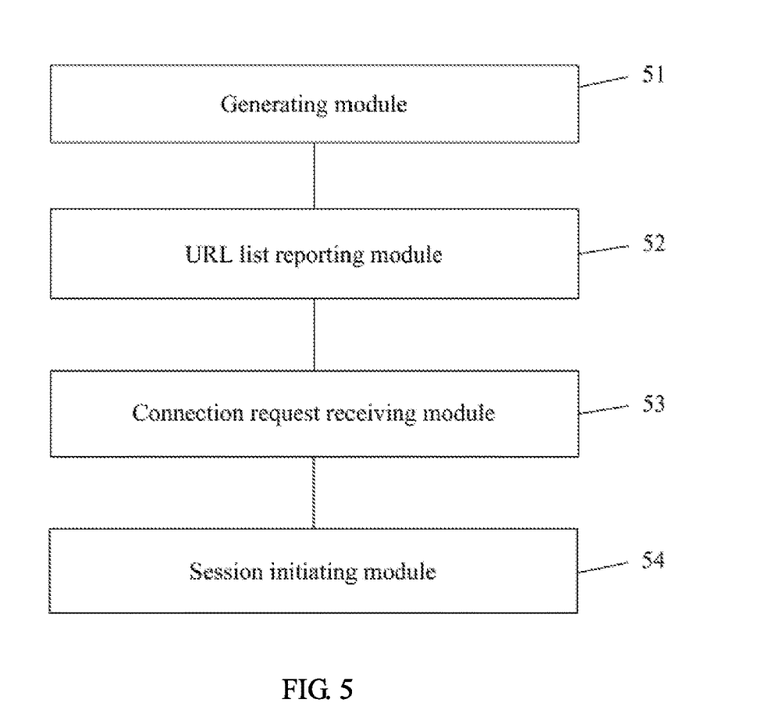
FIG. 5 and FIG. 6 are structural schematic diagrams of a customer premises equipment according to embodiment 5 of the present invention.

This embodiment provides a customer premises equipment. As shown in FIG. 5, the customer premises equipment includes the following steps described below. A generating module 51 is configured to generate a universal resource locator URL list according to IP addresses of uplink interfaces. The URL list includes at least two URLs and each URL has a corresponding uplink interface. A URL list reporting module 52 is configured to send the URL list to an auto-configuration server. A connection request receiving module 53 is configured to receive, through a first uplink interface, a connection request sent by the auto-configuration server. The connection request includes a first URL, the first URL is a URL in the URL list, and the first URL corresponds to the first uplink interface. A session initiating module 54 is configured to use a second uplink interface to initiate a management session to the auto-configuration server.

Specifically, the URL list reporting module 52 may further be configured to send, to the auto-configuration server, information of the uplink interface corresponding to each URL in the URL list.

Further, the URL list reporting module 52 may further be configured to send one or more URLs in the URL list to the auto-configuration server.

Optionally, the connection request module 53 is further configured to determine the second uplink interface according to an uplink interface that is specified in the connection request and used for initiating a management session, or according to status of each uplink interface. For example, when an uplink interface used for initiating a management session is specified in the connection request, the specified uplink interface is used as the second uplink interface. Alternatively, according to the status of each uplink interface, for example, information such as whether it is connectable, a delay, and a packet loss rate, an uplink interface is selected as the second uplink interface: an uplink interface that is connectable and has the shortest delay and lowest packet loss rate is selected as the second uplink interface. In a situation that an uplink interface used for initiating a management session is specified in the connection request, the second uplink interface may be determined with reference to the status of each uplink interface: for example, an uplink interface that is connectable and has the shortest delay and lowest packet loss rate is selected as the second uplink interface, but if there are at least two connectable uplink interfaces that have the shortest delay and lowest packet loss rate, and one of them is the specified uplink interface, the specified uplink interface is selected as the second uplink interface.

It should be noted that, the first uplink interface and the second uplink interface are not necessarily the same uplink interface.

Figure 6:
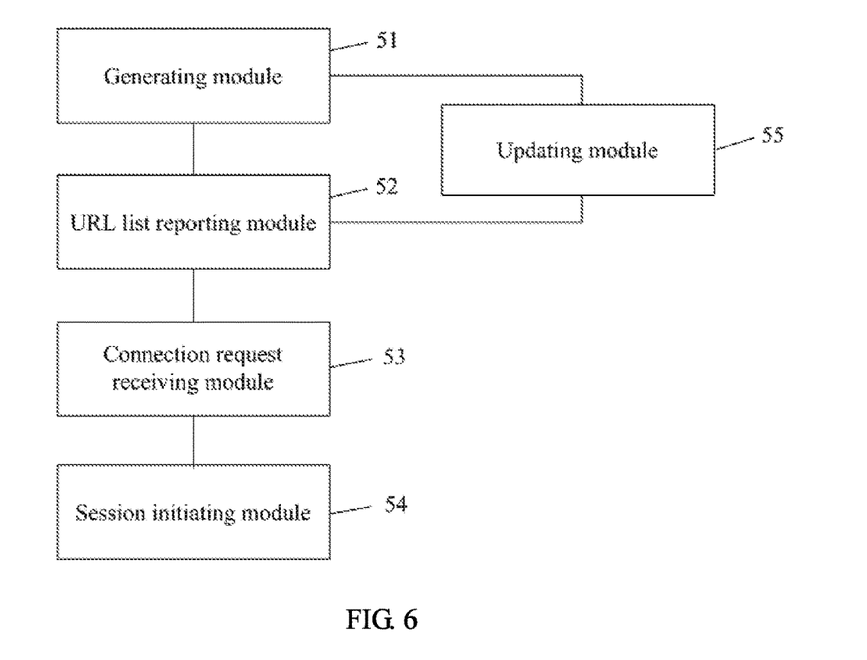

Optionally, as shown in FIG. 6, the customer premises equipment further includes an updating module 55, configured to update the URL list when status of the uplink interface changes. The URL list reporting module 52 is further configured to send the updated URL list to the auto-configuration server.

In the customer premises equipment provided by the embodiment of the present invention, a generating module 51 generates a universal resource locator URL list according to the corresponding IP address of each uplink interface, where each URL in the URL list corresponds to an IP address; then a URL list reporting module 52 reports the URL list to an auto-configuration server ACS; a connection request receiving module 53 selects a first URL from the URL list to initiate a connection request; a session initiating module 54 receives the connection request initiated by the ACS, where the connection request includes the URL selected by the ACS from the URL list; and after the connection request receiving module 53 authenticates the ACS, according to the URL selected by the ACS from the URL list in the connection request, the session initiating module 54 determines a second uplink interface used for initiating a management session, uses the second uplink interface to initiate a management session to the ACS, and establishes the management session with the ACS. Compared with the prior art, the customer premises equipment provided by the embodiment of the present invention is capable of implementing the establishment of a management session between a customer premises equipment supporting a plurality of uplink manners and an auto-configuration server.

Embodiment 6

Figure 7:
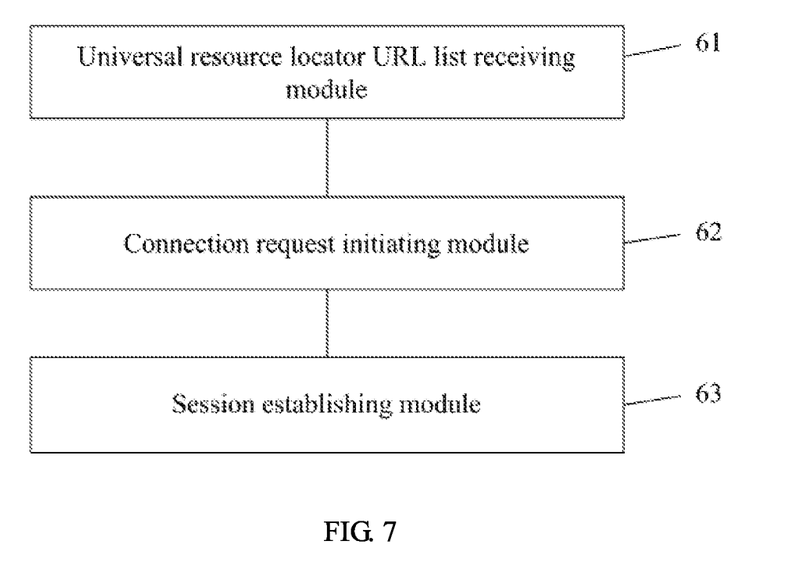
FIG. 7 is a structural schematic diagram of an auto-configuration server according to embodiment 6 of the present invention.

This embodiment provides an auto-configuration server. As shown in FIG. 7, the auto-configuration server includes the following steps described below. A universal resource locator URL list receiving module 61 is configured to receive a universal resource locator URL list sent by a customer premises equipment. A connection request initiating module 62 is configured to select a first URL from the URL list to send a connection request to the customer premises equipment. The connection request includes the first URL, and the first URL corresponds to a first uplink interface of the customer premises equipment. A session establishing module 63 is configured to establish a management session that is initiated by the customer premises equipment by using a second uplink interface.

Specifically, the connection request initiating module 62 is further configured to select the first URL from the URL list to send the connection request to the customer premises equipment according to information of an uplink interface corresponding to each URL in the URL list, and/or a testing situation of each uplink interface.

Further, the connection request initiating module 62 is further configured to specify, in the connection request, the second uplink interface used for the customer premises equipment to initiate a management session.

In the auto-configuration server provided by the embodiment of the present invention, a universal resource locator URL list receiving module 61 receives a universal resource locator URL list reported by a customer premises equipment. A connection request initiating module 62 selects a first URL from the URL list to initiate a connection request to the CPE. The connection request includes the first URL. A session receiving module 63 receives a management session initiated by the CPE by using a second uplink interface, and establishes the management session with the CPE. Compared with the prior art, the auto-configuration server provided by the embodiment of the present invention is capable of implementing the establishment of a management session between a customer premises equipment supporting a plurality of uplink manners and an auto-configuration server.

The customer premises equipment and the auto-configuration server provided by the embodiments of the present invention can implement the foregoing method embodiments. For specific functional implementation, reference may be made to description in the method embodiments, and no further description will be provided herein. The method for establishing a management session, the customer premises equipment, and the auto-configuration server provided by the embodiments of the present invention may be applicable to establishment of a management session between a customer premises equipment and an auto-configuration server, but are not limited thereto.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (ROM), or a random access memory (RAM).

The foregoing descriptions are merely specific embodiments of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A method for establishing a management session, the method comprising:
generating a universal resource locator (URL) list according to IP addresses of uplink interfaces, wherein the URL list comprises at least two URLs and each URL has a corresponding uplink interface, each URL corresponding to a same customer premises equipment;
sending the URL list to an auto-configuration server;
receiving, through a first uplink interface of the customer premises equipment, a connection request sent by the auto-configuration server, wherein the connection request comprises a first URL, wherein the first URL is a URL in the URL list, and wherein the first URL corresponds to the first uplink interface;
determining a second uplink interface of the customer premises equipment, wherein the second uplink interface is an uplink interface used for initiating a management session, and wherein the second uplink interface is determined according to a test result of each URL; and
using the second uplink interface to initiate a management session to the auto-configuration server;
wherein the first uplink interface is based on a different communication technology than the second uplink interface.

2. The method according to claim 1, further comprising:
sending, to the auto-configuration server, information of the uplink interface corresponding to each URL in the URL list.

3. The method according to claim 1, wherein the sending the URL list to an auto-configuration server comprises sending the at least two URLs in the URL list to the auto-configuration server.

4. The method according to claim 1, wherein the receiving a connection request sent by the auto-configuration server and determining a second uplink interface comprises determining the second uplink interface according to an uplink interface specified in the connection request.

5. The method according to claim 1, further comprising:
updating the URL list when status of the uplink interface changes; and
sending the updated URL list to the auto-configuration server.

6. The method according to claim 5, wherein the sending the URL list to an auto-configuration server specifically comprises:
sending the URL list to the auto-configuration server so that the auto-configuration server selects the first URL from the URL list to send the connection request.

7. The method according to claim 1, wherein determining the second uplink interface of the customer premises equipment, wherein the second uplink interface is the uplink interface used for initiating a management session, and wherein the second uplink interface is determined according to the test result of each URL in the URL list, comprises:
testing, by the customer premises equipment, connectivity between each IP address and the auto-configuration server; and
determining, by the customer premises equipment, the second uplink interface according to the test results of the connectivity tests.

8. A method for establishing a management session, comprising:
receiving a universal resource locator (URL) list sent by a customer premises equipment, the URL list comprising a plurality of URLs, and each URL in the URL list corresponds to an uplink interface of the customer premises equipment;
selecting a first URL from the URL list to send a connection request to the customer premises equipment, wherein the connection request comprises the first URL, the first URL corresponds to a first uplink interface of the customer premises equipment, and the first URL is selected according to a test result of each URL in the URL list; and
establishing a management session that is initiated by the customer premises equipment by using a second uplink interface, wherein the second uplink interface used for the customer premises equipment to initiate a management session is specified in the connection request;
wherein the first uplink interface and the second uplink interface are comprised in a gateway.

9. The method according to claim 8, wherein selecting the first URL according to the test result of each URL in the URL list comprises using a Ping protocol to test connectivity between each URL address in the URL list and an auto-configuration server, and selecting the first URL according to a test result of each Ping protocol test.

10. The method according to claim 8, further comprising:
when the URL list changes, receiving an updated URL list sent by the customer premises equipment.

11. A customer premises equipment comprising:
a processor;
a computer-readable storage medium storing a program to be executed by the processor, the program including instructions for:
generating a universal resource locator (URL) list according to IP addresses of uplink interfaces, wherein the URL list comprises at least two URLs and each URL has a corresponding uplink interface, wherein each URL corresponds to the customer premises equipment;
sending the URL list to an auto-configuration server;
receiving, through a first uplink interface, a connection request sent by the auto-configuration server, wherein the connection request comprises a first URL, the first URL is a URL in the URL list, and the first URL corresponds to the first uplink interface, and wherein the connection request is sent using a first communication technology; and
initiating, using a second uplink interface, a management session to the auto-configuration server, wherein the management session uses a second communication technology, and wherein the second uplink interface is determined according to a test result of each URL;
wherein the first uplink interface is based on a different communication technology than the second uplink interface, and wherein the first communication technology is different than the second communication technology.

12. The customer premises equipment according to claim 11, wherein the program further includes instructions for sending, to the auto-configuration server, information of the uplink interface corresponding to each URL in the URL list.

13. The customer premises equipment according to claim 11, wherein the program further includes instructions for determining the second uplink interface according to an uplink interface that is specified in the connection request and used for initiating a management session, or according to status of each uplink interface.

14. The customer premises equipment according to claim 11, wherein the program further includes instructions for updating the URL list when status of the uplink interface changes, and sending the updated URL list to the auto-configuration server.

15. The customer premises equipment according to claim 11, wherein the first uplink interface connects the customer premises equipment to a first connection between the customer premises equipment and the auto-configuration server, the second uplink interface connects the customer premises equipment to a second connection between the customer premises equipment and the auto-configuration server, and wherein the first connection is independent from the second connection.

16. The customer premises equipment according to claim 11, wherein the customer premises equipment is managed by a single auto-configuration server.

17. An auto-configuration server, comprising:
a processor;
a computer-readable storage medium storing a program to be executed by the processor, the program including instructions for:
receiving a universal resource locator (URL) list sent by a customer premises equipment, wherein the URL list includes a plurality of URLS, and each URL of the plurality of URLs corresponds to an uplink interface of the customer premises equipment;
selecting a first URL from the URL list to send a connection request to the customer premises equipment, wherein the connection request comprises the first URL, and the first URL corresponds to a first uplink interface of the customer premises equipment, and wherein the first URL is selected from the URL list according to a status of each URL in the URL list; and
establishing a management session that is initiated by the customer premises equipment by using a second uplink interface, wherein the second uplink interface used for the customer premises equipment to initiate the management session is specified in the connection request;
wherein the first uplink interface and the second uplink interface are comprised in a single gateway device.

18. The auto-configuration server according to claim 17, wherein selecting the first URL according to the status of each URL in the URL list comprises using a Ping protocol to test connectivity between each URL address in the URL list and an auto-configuration server, and selecting the first URL according to a test result of each Ping protocol test.

19. The auto-configuration server according to claim 17, wherein the program further includes instructions for:
when the URL list changes, receiving an updated URL list sent by the customer premises equipment.

* * * * *